United States Patent [19]
Dekura

[11] Patent Number: 5,185,095

[45] Date of Patent: Feb. 9, 1993

[54] PHOSPHONITRILEESTER LUBRICANT FOR HYDROGEN-CONTAINING CHLORO-FLUORO CARBON AND HYDROGEN-CONTAINING FLUORO CARBON REFRIGERANTS

[76] Inventor: Takateru Dekura, No. 1-3, Sasame-cho, Kamakura-shi, Kanagawa-ken, Japan, 248

[21] Appl. No.: 792,159

[22] Filed: Nov. 14, 1991

Related U.S. Application Data

[63] Continuation of Ser. No. 662,846, Mar. 1, 1991, abandoned.

[30] Foreign Application Priority Data

Nov. 30, 1990 [JP] Japan ................... 2-337861

[51] Int. Cl.$^5$ .................. C09K 5/04; C10M 105/56; C10M 105/74
[52] U.S. Cl. .................. 252/68; 252/49.9; 252/67; 558/80
[58] Field of Search ........... 252/68, 67, 49.9, 78.5; 558/80

[56] References Cited

U.S. PATENT DOCUMENTS

| | | | |
|---|---|---|---|
| 3,450,799 | 6/1969 | Kober et al. | 252/78.5 |
| 3,462,518 | 8/1969 | Kober et al. | 252/78.5 |
| 4,948,525 | 8/1990 | Sasaki et al. | 252/68 |
| 4,971,897 | 11/1990 | Chen et al. | 558/80 |

Primary Examiner—Christine Skane
Attorney, Agent, or Firm—Keck, Mahin & Cate

[57] ABSTRACT

The object of the present invention is to provide a lubricant which has a wide range viscosity-temperature characteristic, low pour point and compatibility with hydrogen-containing chloro-fluoro carbons and fluoro carbons refrigerants.

To achieve the object mentioned above, a lubricant for hydrogen-containing chloro-fluoro carbon and fluoro carbon refrigerants according to the present invention has a formula (1):

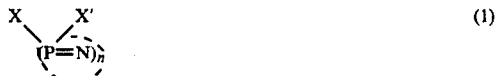

wherein n is 3 to 4, X and X' are same or different and each selected from a group of moieties represented by the formula:

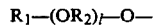

wherein $R_1$ is an alkyl group of 1 to 12 carbon atoms or aryl group of 6 to 18 carbon atoms, $R_2$ is an alkylene group of 2 to 4 carbon atoms, and the chain of $OR_2$s consists of, for example, an alkylene group of 2, 3 or 4 carbon atoms and may be of homogeneous or random or block combination;

l is 2 to 35, preferably 3 to 20, the molecular weight of the moiety is within the range from 200 to 1700, and the viscosity of the moiety is preferably 7 to 30 mm$^2$/S at 40° C.

4 Claims, No Drawings

PHOSPHONITRILEESTER LUBRICANT FOR HYDROGEN-CONTAINING CHLORO-FLUORO CARBON AND HYDROGEN-CONTAINING FLUORO CARBON REFRIGERANTS

This is a continuation of application Ser. No. 07/662,846, filed Mar. 1, 1991, now abandoned.

BACKGROUND OF THE INVENTION (1) Field of the Invention

The present invention relates to a novel lubricant for use with hydrogen-containing chloro-fluoro carbon and fluoro carbon refrigerants.

Particularly, the present invention relates to a novel lubricant for use in refrigerators and the like, which has a polyglycol chain and a phosphonitrile skeleton, and which has an excellent lubricity as well as good compatibility with hydrogen-containing chloro-fluoro carbon and fluoro carbon refrigerants.

(2) Description of the Prior Art

Generally, the refrigerator is a device in which the compressor serves to create a low temperature by means of repetitive liquefaction and vaporization of refrigerants, and this device consists of a vaporizer, a compressor, an expansion valve and the like, through which the refrigerants and the lubricant circulate to establish a cycle of absorption and release of the heat. Refrigerating oil which is dissolved in the refrigerant circulates the refrigeration systems and this lubricant serves to help operate the refrigeration equipments.

Refrigerating oil generally consists of naphthene or paraffin based mineral oils and alkylbenzene, with the addition of an antioxidant, l metal deactivator, an anti wear agent, a corrosion inhibitor, etc.

Therefore, the lubricant is required to have good compatibility with the refrigerant, stability in the presence of the refrigerant, lubricity for the instrument (anti wear, anti seize properties).

Refrigerators employ as refrigerants fluorine, chlorine and carbon, for example, trichloromonofluoromethane (R11), dichlorodifluoromethane (R12), monochlorodifluoromethane (R22) and the like.

Recently, a decrease in the use of chloro fluoro carbons was agreed to under the Montreal Protocol, for the purpose of protecting the ozone layer in stratosphere. Accordingly, the USA Environmental Protection Agency (EPA) recommended 6 hydrogen-containing chloro-fluoro carbon alternatives, namely, 1, 1-dichloro-2, 2, 2-trifluoroethane (HCFC-123), 1-chloro-1, 2, 2, 2-tetrafluoroethane (HCFC-124), 1, 2-dichloro-2, 2-difluoroethane (HCFC-132b), 1-chloro-2, 2, 2-trifluoroethane (HCFC-133a), 1, 1, 1, 2-tetrafluoroethane (HCFC-134a) and 1, 1-dichloro-1-fluoroethane (HCFC-141b). Among these, the use of 1, 1, 1, 2-tetrafluoroethane as an alternative for R-12 is brought into discussion because of its physical properties similar to those of R-12.

A polyalkyleneglycol base lubricant capable of applying to 1, 1, 1, 2-tetrafluoroethane was disclosed by Du Pont (U.S.A.) in Research Disclosure No. 17483 (October, 1978). Polyalkyleneglycol base lubricant was also disclosed in U.S. Pat. No. 4,755,316 (July, 1988).

Also in Japan, polyalkyleneglycol base lubricants have been studied and various polyalkyleneglycol derivatives have been developed, as disclosed in Published Japanese Patent Unexamined Application 1-198, 694, 1-259, 093, 1-259, 094, 1-259, 095, 2-43, 290, 2-84, 491, 2-102, 296, 2-140, 295, 2-242, 888, 2-258, 895 and 2-269, 195.

SUMMARY OF THE INVENTION

However, the lubricants of the prior art generally have a poor lubricity and contain an anti wear agent to improve the lubricity. Accordingly, the object of the present invention is to provide a lubricant which has a high viscosity index, low pour point, and compatibility with hydrogen-containing chloro-fluoro carbons and fluoro carbons refrigerants.

DESCRIPTION OF THE PREFERRED EMBODIMENT

To achieve the object mentioned above, a lubricant for use with a hydrogen-containing refrigerant according to the present invention has a formula (1):

wherein n is 3 to 4, X and X' are same or different and each is selected from a group of moieties represented by the formula:

wherein $R_1$ is an alkyl group of 1 to 12 carbon atoms or aryl group of 6 to 18 carbon atoms, $R_2$ is an alkylene group of 2 to 4 carbon atoms, and the chain of $OR_2$s consists of, for example, an alkylene group of 2, 3 or 4 carbon atoms and may be of homogeneous or random or block combination.

l is 2 to 35, preferably 3 to 20, the molecular weight of the moiety is within the range from 200 to 1700, and the viscosity of the moiety is preferably 7 to 30 mm$^2$/S at 40° C. The refrigerant employed herein may be selected from the group consisting of 1,1-dichloro-2,2,2-trifluoroethane, 1-chloro-1,2,2,2-tetrafluoroethane, 1,2-dichloro-2,2-difluoroethane, 1-chloro-2,2,2-trifluoroethane, 1,1,1,2-tetrafluoroethane, 1,1-dichloro-1-fluoroethane, 1,1-difluoroethane and trifluoromethane.

The final lubricant composition of the present invention may contain, if necessary, an antioxidant, metal deactivator and a corrosion inhibitor.

Antioxidant employed herein includes amines such as phenylalphanaphthylamine and derivatives thereof, diphenylamine and derivatives thereof, 2, 6-di-t-butyl-alpha-dimethylamino-percresol and 4, 4'-tetramethyl-diaminodiphenylmethane, phenols such as 2, 6-di-t-butyl-p-cresol, 4, 4'-methylenebis (2, 6-di-t-butylphenol), octadecyl-3-(3, 5-di-t-butyl-4-hydroxyphenyl)-propionate, pentaerythrityl-tetrakis [3-(3, 5-di-t-butyl-4-hydroxyphenyl) propionate], 1, 3, 5-trimethyl-2, 4, 6-tris (3, 5-di-t-butyl-4-hydroxybenzyl) benzene, bis (3, 5-di-t-butyl-4-hydroxybenzyl) sulfide, 4, 4-thiobis (-methyl-6-t-butylphenol and the like.

The metal deactivator includes benzotriazol and derivatives thereof, imidazol, thiazol, thiaziazol and derivatives thereof, N, N'-disalicyliden-1, 2-propanediamine and the like, and corrosion inhibitor includes sodium, calcium and barium alkylbenzenesulfonate, sodium, calcium and barium nonylnaphthalenesulfonate, alkylamine salt of phosphate, alkyl and alkenyl ester of alkenylsuccinic acid. Each of these additives may be added alone or in combination, preferably in an amount from 0.01 to 5% by weight.

No anti wear agent is required to be added when the present compound is employed since the present compound contains phosphorus and therefor has an anti wear effect, although phosphate is commonly added in the art as an anti wear agent. Thus the present compound exhibits a lubricity effect for the bearing and the piston/cylinder of a compressor comparable with or superior to polyalkylnenglycol lubricants supplemented with anti wear agent.

The compounds represented by formula (1) above may be prepared, for example, by the procedures described below.

Synthesis 1

324 g (2 mole) of butyldiglycol and 3.3 g (about 1% by weight of butyldiglycol) of potassium hydroxide were placed in an autoclave, and purged with nitrogen three times at 3 kg/cm$^2$ and then heated to 120° C.

Subsequently, 464 g (8 mole) of propyleneoxide was introduced while maintaining the inner pressure at 8 kg/cm$^2$ or lower over about 8 hours and then the temperature was kept at 140° C. for 3 hours to complete the reaction, and then the mixture was recovered. The mixture was neutralized with phosphoric acid, washed with water, heated to 140° C. to dehydrate, filtrated through celite to give 772 g of product (yield 98%).

The product had a moisture content of 0.05% by weight, pH6.8, hydroxyl value of 145.7, viscosity 10.4 mm$^2$/S at 40° C. and pour point of −60° C. or lower.

Then 235 g (0.61 mole) of the product thus obtained (molecular weight calculated from OH value: 385.04) was placed together with 500 ml of toluene in a four neck flask fitted with condenser, stirrer and thermometer, and 15 g of sodium chip (0.65 mole) was added while cooling and then reacted for 4 hours at 40° C. until sodium was dissolved completely. To this reaction mixture, a solution of 36.5 g (0.105 mole) of phosphonitrilechloride trimer (melting point 112° to 114° C.) in 250 ml of toluene was added dropwise until 50° C. and reacted for 4 hours under reflux at 110° to 115° C. Small amount of water and dilute HCl was added to the reaction product to effect azeotropic dehydration, and resulting sodium chloride was removed by centrifugation. After washing with water and drying followed by removing toluene under reduced pressure, 235 g of the product was obtained as pale yellow transparent material.

OH value determined according to JIS K0070 (Japanese Industrial Standard Method) was 0.3 and chlorine determined according to JIS K2241 was 0.02%.

Infrared spectrum (obtained by using Nihon Bunko IR model 810) showed disappearance of absorption at 3,250 cm−$^1$ by OH radical and appearance of the peak of 1,424 cm−$^1$ which indicates the absorption by C—O—P aliphatic, indicating the structure of hexakis (butyldioxyethylenetetraoxypropyleneoxy) cyclic triphosphonitrileester. The material obtained has a density of 0.99/gcm$^3$ at 15/4° C., viscosity of 75.7 mm$^2$/S at 40° C. and 14.8 mm$^2$/S at 100° C. and pour point of −47.5° C.

Synthesis 2

162 g (1.0 mole) of butyldiglycol and 1.65 g (about 1% by weight of butyldiglycol) of potassium hydroxide were placed in an autoclave, and purged with nitrogen three times at 3 kg/cm$^2$ and then heated to 120° C.

Subsequently, 465 g (8.01 mole) of propyleneoxide was introduced while maintaining the inner pressure at 8 kg/cm$^2$ or lower over about 8 hours and then the temperature was kept at 140° C. for 3 hours to complete the reaction, and then the mixture was recovered.

The mixture was neutralized with phosphoric acid, washed with water, heated to 140° C. to dehydrate, filtrated through celite to give 608 g of product (yield 97%).

The product had a moisture content of 0.05% by weight, pH7.0, hydroxyl value of 90, viscosity of 21.7 mm$^2$/S at 40° C. and pour point of −60° C. or lower.

Then 374 g (0.60 mole) of the product thus obtained (molecular weight calculated from OH value: 623.3) was placed together with 700 ml of toluene in a four neck flask fitted with condenser, stirrer and thermometer, and 14.2 g of sodium chip (0.617 mole) was added while cooling and then reacted for 4 hours at 40° C. until sodium was dissolved completely.

To this reaction mixture, a solution of 36 g (0.104 mole) of phosphonitrilechloride trimer (melting point 112° to 114° C.) in 250 m( of toluene was added dropwise until 50° C. and reacted for 4 hours under reflux at 110° to 115° C.

Small amount of water and dilute HCl was added to the reaction product to effect azeotropic dehydration, and resulting sodium chloride was removed by centrifugation. After washing with water and drying followed by distilling toluene off under reduced pressure, 370 g of the product was obtained as pale yellow transparent liquid. OH value and chlorine content determined similarly as in Synthesis 1 above were 0.2 and 0.03%, respectively.

Infrared spectrum showed almost disappearance at 3,250 cm−$^1$ of OH absorption and appearance of the peak of 1,424 cm−$^1$ which represents the absorption by C—O—P aliphatic, indicating the structure of hexakis (butyldioxyethyleneoctaoxypropyleneoxy) cyclic triphosphonitrileester. The material obtained has a density of 0.98 g/cm$^2$ at 15/4° C., viscosity of 155 mm$^2$/S at 40° C. and 29.4 mm$^2$/S at 100° C. and pour point of −50° C.

Synthesis 3

Similarly as in Synthesis 1 described above, 437 g (2.0 mole) of 2-ethylhexyldiglycol and 4.4 g (about 1% by weight of 2-ethylhexyldiglycol) of potassium hydroxide were placed in an autoclave, and purged with nitrogen three times at 3 kg/cm$^2$ and then heated to 120° C. Subsequently, 465 g (8.01 mole) of propyleneoxide was introduced while keeping the inner pressure at 8 kg/cm$^2$ or lower over about 8 hours and then the temperature was kept at 140° C. for 3 hours to complete the reaction, and then the mixture was recovered. The mixture was neutralized with phosphoric acid, washed with water, heated to 140° C. to dehydrate, filtrated through celite to give 883 g of product (yield 98%). The product had a moisture content of 0.03% by weight, pH6.8, hydroxyl value of 125, viscosity of 11.5 mm$^2$/S at 40° C. and pour point of −60° C. or lower.

Then 270 g (0.602 mole) of the product thus obtained (molecular weight calculated from OH value: 448.8) was placed together with 500 ml of toluene in a four neck flask fitted with condenser, stirrer and thermometer, and 14 g of sodium chip (0.609 mole) was added while cooling and then reacted for 4 hours at 40° C. until sodium was dissolved completely.

To this reaction mixture, a solution of 35.5 g (0.102 mole) of phosphonitrilechloride trimer (melting point 112° to 114° C.) in 250 ml of toluene was added dropwise until 50° C. and reacted for 4 hours under reflux at 110° to 115° C. Small amount of water and dilute HCl was added to the reaction product to effect azeotropic dehydration, and resulting sodium chloride was removed by centrifugation. After washing with water and drying followed by distilling toluene off under reduced pressure, 270 g of the product was obtained as pale yellow transparent liquid.

OH value and chlorine content determined similarly as in Synthesis 1 above were 0.2 and 0.02%, respectively.

Infrared spectrum showed almost disappearance at 3,250 cm$^{-1}$ of OH absorption and appearance of the peak of 1,424 cm$^{-1}$ which represents the absorption by C—O—P aliphatic, indicating the structure of hexakis (2-ethylhexyldioxyethylenetetraoxypropyleneoxy) cyclic triphosphonitrileester.

The material obtained has a density of 0.98 g/cm$^3$ at 15/4° C., viscosity of 84 mm$^2$/S at 40° C. and 15.86 mm$^2$/S at 100° C. and pour point of −50° C.

EFFECT

The present invention provides a cyclic phosphonitrile-ester consisting of polyalkyleneglycols and cyclic phosphonitrilechloride trimers or tetramers.

The present compound comprises an organic substance having 3 or 4 phosphonitrile groups in approximately central portion of the chain, and exhibits good interaction to the metals due to the higher affinity for inorganic materials.

In addition, the present phosphonitrileester, which had been prepared by esterification with polyalkyleneglycols, has no OH radical, thus exhibiting higher compatibility with hydrogen-containing chloro-fluoro carbons and fluoro carbon refrigerants.

Moreover, it has the excellent properties of polyalkyleneglycols, such as low temperature flowability and broad range of viscosity—temperature characteristics.

EXAMPLE

For the purpose of illustrating the preferred examples of the present invention, physical properties of the base reagents employed in Synthesis 1, 2 and 3 described above and in Comparatives are listed in Table 1.

The present invention is, not limited by the examples shown below.

EXAMPLE 1

(Fail Load Resistance)

Lubricity of the lubricant of the present invention was determined by using Falex fail load resistance test and the results are shown in Table 2.

The test was conducted according to ASTM D 3233, and the fail load (lbs) after break-in operation for 5 minutes at 150 lbs load (68 kg) at oil temperature of 25° C. was determined.

EXAMPLE 2

(Thermalstability: sealed tube test)

1 g of each of samples 1 to 5 and 1, 1, 1, 2-tetrafluoroethane was placed in a glass tube and then 1 piece of iron, copper and aluminum alloy chips was added in each tube. The tube was sealed and heated at 175° C. for 14 days (336 hours). Then the change in color of the sample was determined according to JIS K2580 (ASTM D1500 color test) (see Table 3)

| Material of metal pieces: | Steel | SAE 1020 |
| | Copper | ASTM B152 |
| | Aluminum alloy | ASTM B179 |
| Shape of metal pieces: | 2 mm (H) × 2 mm (W) × 40 mm (L) | |

EXAMPLE 3

(Compatibility)

Phase separation at low temperature between lubricant of the present invention and target refrigerants was observed.

0.5 g of sample and, as a refrigerant, 2.5 g of 1, 1, 1, 2-tetrafluoroethane were placed in a glass tube, sealed and then subjected to heating and cooling by 1° C./min by means of thermostat to determine the temperature at which the mixture became turbid or phase separation occurred. The results are shown in Table 4.

THE EFFECT OF THE INVENTION

A lubricant for use with hydrogen-containing chlorofluoro carbons and fluoro carbon refrigerants according to the present invention can be utilized as an excellent lubricant for refrigerators, which has lubricity (fail load resistance) as well as high compatibility with hydrogen-containing chlorofluoro carbon and fluoro carbon refrigerants. It exhibits particularly good compatibility with 1, 1, 1, 2-tetrafluoroethane, and causes no phase separation at a low temperature, thus being a stable lubricant for refrigerators.

TABLE 1

| | Density 15/4° C. g/cm$^3$ ASTM D1480 | Viscosity ASTM D446 | | Viscosity index ASTM D2270 | Pour point ASTM D97 |
| --- | --- | --- | --- | --- | --- |
| | | 40° C. mm$^2$/S | 100° C. mm$^2$/S | | |
| 1. Hexakis (butyldioxyethylene-tetraoxypropyleneoxy) tri-phosphonitrile | 0.99 | 75.7 | 14.8 | 150 | −47.5 |
| 2. Hexakis (butyldioxyethylene-octaoxypropyleneoxy) triphosphonitrile | 0.98 | 155 | 29.4 | 144 | −50.0 |
| 3. Hexakis (2-ethylhexyldioxy-tetraoxypropyleneoxy) tri-phosphonitrile | 0.98 | 84 | 15.8 | 148 | −50.0 |
| 4. Polyoxypropyleneglycol mono-butylether Average molecular weight: 1,000 | 0.93 | 61 | 10.8 | 142 | −42.5 |
| 5. Polyoxypropyleneglycol mono-butylether Average molecular weight: 1,500 | 0.94 | 113 | 18.3 | 140 | −35.0 |

TABLE 2

|  | Viscosity 100° C. mm²/S | Fail load lbs (kg) |
| --- | --- | --- |
| Table 1  1 | 14.8 | 1,100 (499) |
| Table 1  2 | 29.4 | 1,150 (521) |
| Table 1  3 | 15.8 | 1,200 (544) |
| Comparative 4 (Table 1) | 10.8 | 550 (249) |
| Comparative 5 (Table 1) | 18.3 | 600 (272) |

TABLE 3

|  | Lubricant color | | Appearance of metal pieces | | |
| --- | --- | --- | --- | --- | --- |
|  | Before test | After test | Iron | Copper | Aluminum alloy |
| 1, 1, 1, 2-tetrafluoroethane | L 0.5 | L 1.0 | No change | No change | No change |
| Table 1  1 | L 1.5 | L 2.5 | No change | Moderate change | No change |
| Table 1  2 | L 1.5 | L 2.5 | No change | Moderate change | No change |
| Table 1  3 | L 1.5 | L 2.5 | No change | Moderate change | No change |
| Table 1  *1 | L 1.5 | L 2.0 | No change | No change | No change |
| Table 1  *3 | L 1.5 | L 2.0 | No change | No change | No change |
| Comparative 4 (Table 1) | L 0.5 | L 2.0 | No change | No change | No change |

Remarks "*" are to indicate that 0.3% by weight of pentaerythrityl-tetrakis [3-(3.5-di-t-butyl-4-hydroxyphenol)propionate] as an antioxidant and 0.05% by weight of tolyl triazol as a metal deactivator are added to Table 1 - 1 and Table 1 - 3.

TABLE 4

|  | Phase separation temperature (°C.) | |
| --- | --- | --- |
|  | Low temperature range | High temperature range |
| Table 1  1 | −60° C. minimum | 90° C. minimum |
| Table 1  2 | −60° C. minimum | 90° C. minimum |
| Table 1  3 | −60° C. minimum | 90° C. minimum |
| Table 1  *1 | −60° C. minimum | 90° C. minimum |
| Table 1  *3 | −60° C. minimum | 90° C. minimum |
| Comparative 4 (Table 1) | −60° C. minimum | 85° C. |

What is claimed is:

1. A refrigerant composition, comprising:
   a refrigerant selected from the group consisting of hydrogen-containing chloro-fluoro carbons and hydrogen-containing fluorocarbons; and
   a lubricant compound including a cyclic phosphonitrileester having the formula:

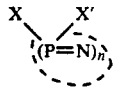

wherein n is 3 to 4
   X and X' are same or different and each represented by the formula: $R_1-(OR_2)_l-O-$,
   wherein $R_1$ is selected from the group consisting of an alkyl group of 1 to 12 carbon atoms and an aryl group of 6 to 18 carbon atoms,
   $R_2$ is selected from the group consisting of a straight and a branched alkylene group of 2 to 4 carbon atoms, and the chain $OR_2$ group represents homogeneous or random or block combination, and l is an integer from 2 to 35.

2. The composition of claim 1, wherein the refrigerants are selected from the group consisting of 1,1-di-chloro-2,2,2-trifluoroethane; 1-chloro-1,2,2,2-tetra-fluoroethane; 1,2-dichloro-2,2-difluoroethane; 1-chloro-2,2,2-trifluoroethane; 1,1,1,2-tetrafluoroethane; 1,1-dichloro-1-fluoroethane; 1,1-difluoroethane and trifluoromethane.

3. A method for lubricating refrigerator parts, comprising the step of:
   adding to the refrigerants selected from the group consisting of hydrogen-containing chloro-fluoro carbons and hydrogen-containing fluoro-carbons a lubricatory effective amount of a lubricant compound including a cyclic phosphonitrileester having the formula:

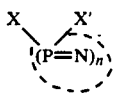

wherein n is 3 to 4,
   X and X' are same or different and each represented by the formula: $R_1-(OR_2)_l-O-$,
   wherein $R_1$ is selected from the group consisting of an alkyl group of 1 to 12 carbon atoms and an aryl group of 6 to 18 carbon atoms,
   $R_2$ is selected from the group consisting of a straight and a branched alkylene group of 2 to 4 carbon atoms, and the chain $OR_2$ group represents homogeneous or random or block combination, and l is an integer from 2 to 35.

4. The method of claim 3, wherein the refrigerants are selected from the group consisting of 1,1-di-chloro-2,2,2-trifluoroethane; 1-chloro-1,2,2,2-tetra-fluoroethane; 1,2-dichloro-2,2-difluoroethane; 1-chloro-2,2,2-trifluoroethane; 1,1,1,2-tetrafluoroethane; 1,1-dichloro-1-fluoroethane; 1,1-difluoroethane and trifluoromethane.

* * * * *